March 4, 1969     J. T. CARY     3,431,532
ROTARY CONDUCTOR
Filed Aug. 5, 1966
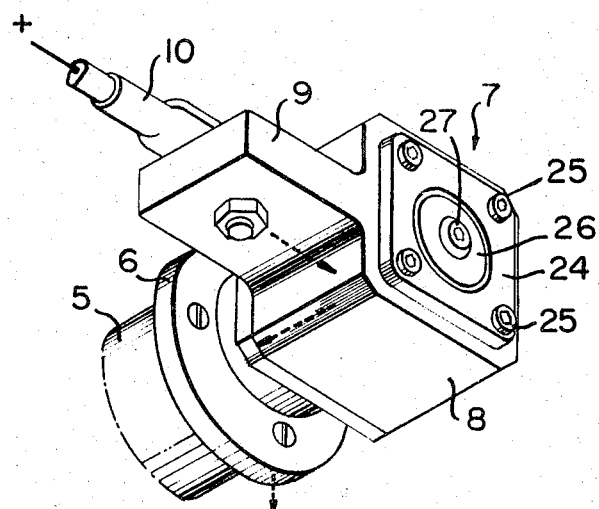
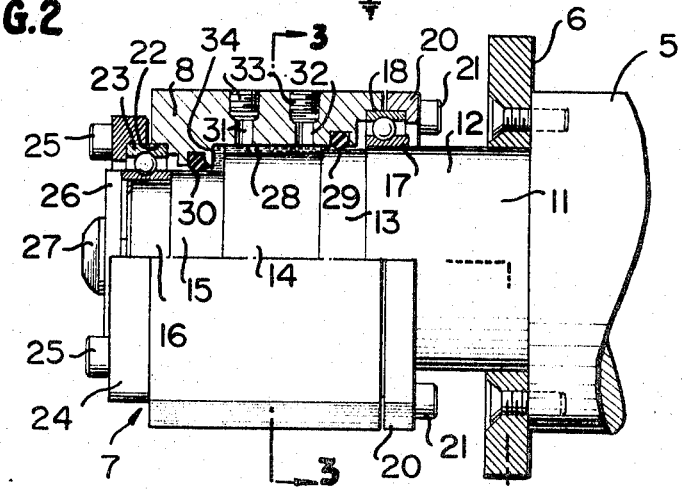
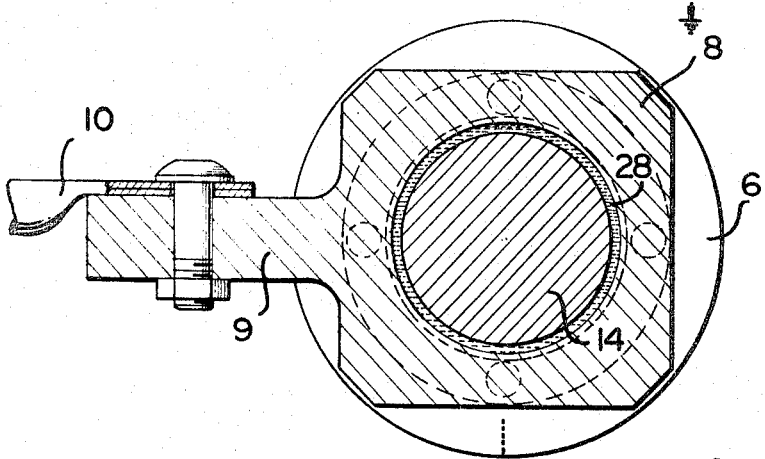
INVENTOR
JOHN T. CARY
BY Mason, Porter, Diller & Brown
ATTORNEYS

United States Patent Office 3,431,532
Patented Mar. 4, 1969

3,431,532
ROTARY CONDUCTOR
John T. Cary, Markham, Ill., assignor to Continental Can Company, Inc., New York, N.Y., a corporation of New York
Filed Aug. 5, 1966, Ser. No. 570,580
U.S. Cl. 339—8                                8 Claims
Int. Cl. H01r 35/00

ABSTRACT OF THE DISCLOSURE

This disclosure relates to a rotary conductor for transferring electrical energy involving high levels of current wherein a liquid metal is utilized to accomplish an electrical connection between two relatively large moving conductors. The disclosure particularly relates to the solution of the problem of reducing the results of an electromagnetic force on the liquid metal due to the offsetting of the conductors axially of a shaft of the conductor and the elimination of the amalgamation of the liquid metal and the metal of the rotary conductor.

---

This invention relates in general to new and useful improvements in electrical couplings, and more particularly to a novel electrical coupling in the form of a rotary joint which may be considered a rotary conductor.

This invention particularly relates to a rotary conductor for transferring electrical energy involving high levels of current wherein a liquid metal is utilized to accomplish an electrical connection between two relatively moving conductors. In the past, a shaft having an enlarged portion, generally in the form of a disc, is permitted to rotate in a pool of liquid metal, such as mercury. When the size of the rotary conductor is very large as compared to the level of current passing therethrough, such a joint functions satisfactorily. On the other hand, when the size of the rotary conductor is to be held to a minimum, it is not possible to permit only a portion of the rotating element to dip into a pool of the liquid metal. It is, therefore, the primary object of this invention to provide a workable rotary conductor suitable for transferring electrical energy involving high levels of current and at the same time to hold the size of the rotary conductor to a minimum.

In accordance with this invention, there has been provided a rotary conductor which includes a shaft and a housing of which either may be the stationary member and wherein the housing is filled with the liquid metal surrounding the shaft so as to provide a maximum contact area between the liquid metal conductor and the shaft and the housing. While this arrangement has provided satisfactory results from the standpoint of transferring electrical energy involving high levels of current, when there is an offsetting of the couplings of conductors to the shaft and housing axially of the shaft, difficulties have arisen in the sealing of the housing relative to the shaft to prevent the forcing of the liquid metal out of the joint area. It has been found that the offsetting of the coupling of the conductors axially of the shaft results in an electromagnetic force on the liquid metal forcing it in an axial direction and tending it to force it out between the shaft and the seal carried by the housing.

In view of the foregoing, it is another object of this invention to provide a novel baffle arrangement within a rotary conductor to counteract the electromagnetic force on the liquid metal conductor material whereby the undue loading on the seals preventing the normal escape of the liquid metal is eliminated.

A further object of this invention is to provide a very small rotary conductor which is capable of transferring electrical energy involving high levels of current on the order of 5,000 amperes with the resistance of the rotary conductor being in the range of 5–30 microohms.

Another object of this invention is to provide a novel rotary conductor which utilizes liquid metal as an electrical connection between the relative rotating elements thereof and wherein the surfaces of the relatively rotating elements which are contacted by the liquid metal are metal plated in accordance with the specific liquid metal being utilized in order to increase the tendency of the liquid metal to adhere to or wet the relative moving elements and thereby decrease electrical energy losses within the rotary conductor or joint.

In the past, although liquid metals were used for rotary conductors, the use of a protective metal coating or plating on the relative rotating elements was especially avoided to allow amalgamation between the liquid metal and the base metal of the relative moving elements. This amalgamation was thought to increase wetting and while this has been found to be initially true, after a short time, the amalgamated coupling will demonstrate increasing resistance and consequent higher losses with dimensional changes resulting from localized heating.

From the foregoing, it will be apparent that the ultimate object of this invention is to provide a rotary conductor having a low and constant resistance while capable of transferring electrical energy involving a high level of current on the order of 5,000 amperes.

With the above and other objects in view that will hereinafter appear, the nature of the invention will be more clearly understood by reference to the following detailed description, the appended claims and the several views illustrated in the accompanying drawing:

In the drawing:

FIGURE 1 is a perspective view of a welding apparatus roller electrode having current supplied thereto through a rotary conductor formed in accordance with this invention.

FIGURE 2 is a rotated side elevational view of the roller electrode and the rotary conductor with portions thereof broken away and shown in section in order to clearly illustrate the constructional details thereof.

FIGURE 3 is a transverse sectional view taken along the line 3—3 of FIGURE 2 and shows further the details of the rotary conductor.

Referring now to the drawing in detail, it will be seen that there is illustrated a shaft 5 on which there is removably secured a roller electrode 6. The shaft 5 is journalled for rotation in any desired manner.

In order that current may be supplied to the roller electrode, one end portion of the shaft 5 is part of a rotary coupling which is generally referred to by the numeral 7.

The rotary coupling 7 includes basically a housing 8 which is illustrated as being generally square in external configuration and which has a lug 9 projecting from one side thereof. The lug 9 has suitably secured thereto an appropriate conductor 10.

The shaft 5 has a shaft extension 11 which extends through the housing 8 and which is of a stepped configuration. The shaft extension 11 includes a portion 12 of maximum diameter, a first intermediate portion 13 of lesser diameter, a central portion 14 of still further reduced diameter, a second intermediate portion 15 of still further reduced diameter and a terminal portion 16 which is still further reduced in diameter. The portion 12 of the shaft extension 11 is snugly received within an antifriction bearing 17 which is partially seated in a recess 18 formed in one end of the housing 8. The bearing 17 is retained in the recess 18 by means of a retaining plate 20 which is releasably secured to the housing 8 by means of a plurality of fasteners 21.

The other end of the housing 8 is recessed as at 22 and has seated therein a second conventional anti-friction bearing 23. The bearing 23 has snugly received therein the terminal portion 16. The bearing 23 is retained in the recess 22 by means of a collar 24 which is releasably secured to the housing 8 by a plurality of fasteners 25. At the same time, the axial position of the housing 8 relative to the shaft extension 11 is maintained by means of a washer or plate 26 which is secured to the free end of the shaft extension 11 by means of a central fasteners 27 with the inner surface of the plate 26 being abutted against the outer end of the inner race of the bearing 23. Inasmuch as this inner race abuts against the outer end of the second intermediate portion 15, it will be apparent that the housing 8 is axially fixed relative to the shaft extension 11 by the plate 26.

It is the intention of this invention that the primary surface area of the shaft extension 11 through which electrical energy will be transferred, be the central portion 14 and the surface area of the housing 8 through which electrical energy will be transferred will be the central portion of the housing in alignment with the shaft extension central portion 14. The space between these portions of the shaft extension 11 and the housing 8 are filled with a suitable liquid metal 28. Escape of the liquid metal 28 axially between the shaft extension 11 and the housing 8 is prevented by means of O rings 29 and 30 which ride on the intermediate portions 13 and 15 of the shaft extension, the O rings 29 and 30 being suitably seated within grooves formed in the housing 8. The housing 8 is filled with the liquid metal 28 by means of a pair of passages 31 and 32 which are normally closed by means of suitable threaded plugs 33. It is to be understood that during the filling operation, liquid metal will be poured in through one of the passages while the other of the passages will function as a vent. Of course, the liquid metal 28 may be removed from the housing 8 in a reverse manner.

It is to be noted that the reduction in diameter between the first intermediate portion 13 and the central portion 14 is relatively small while the reduction in diameter between the central portion 14 and the second intermediate portion 15 is relatively great. When the rotary conductors were first made, these two reductions in diameters were substantially the same, the diameters being reduced and the shaft extension 11 being of a stepped construction solely to facilitate the assembling of the shaft extension and the housing. However, it was found that in operation the liquid metal 28 was driven between the seal 30 and the shaft extension 11 although it was not driven between the seal 29 and the shaft extension. A thorough investigation of this unusual condition resulted in the finding that due to the offsetting of the lug 9 with respect to the roller electrode, that is the offsetting of the connections between conductors with the rotary conductor, an electromagnetic force was generated which reacted on the liquid metal 28 and force it axially of the shaft extension 11 in the direction of the seal 30.

A highly practical solution to the problem of the forced flow of the liquid metal between the shaft extension and the seal 30 was found after much experimentation. The housing 8 has been provided with an integral baffle 34 in axial alignment with the liquid metal 28 disposed between the shaft extension central portion 14 and the housing 8. In view of the fact that the bulk of the liquid metal 28 is disposed in this area, it will be seen that the electromagnetic force thereon will drive the liquid metal against the baffle 34 and the pressure exerted on the seal by the liquid metal due to the electromagnetic force is for all practical purposes eliminated. It is to be noted that the baffle 34 is formed by merely inwardly projecting the housing 8 in stepped relation and that the baffle 34 is merely in the form of a shoulder resulting from that projection. It is also to be noted that the seal 30 is seated within the projection so as to be closely adjacent the baffle 34.

At this time it is pointed out that the stepped relationship of the shaft extension 11 is somewhat exaggerated in the drawings. The intermediate portion 13 of the shaft extension runs very close to the housing 8 and the reduction in diameter between the intermediate portion 13 and the central portion 14 is very small so that the liquid metal 28 disposed between the central portion 14 of the shaft extension and the housing 8 may be considered in the form of a film.

The problem of the expulsion of the liquid metal having been solved, a further problem presented itself. It was known to form the relative rotating elements of a rotary conductor of basic forms of copper and to utilize mercury as a liquid metal. It was also the theory that these metals were satisfactory in that an amalgamation between the metals results, which amalgamation was thought to increase the wetting characteristics of the liquid metal with respect to the relative rotating elements of the rotary conductor. In fact, it was found that the theory with respect to amalgamation was correct in that after amalgamation occurred, electrical energy losses within the rotary conductor were reduced. Unfortunately, the condition did not remain static and after a short time, the amalgamated rotary conductor demonstrated increasing resistance and consequent higher losses with there also being dimensional changes resulting from localized heating. In accordance with this invention, it has been found that it is necessary to avoid amalgamation in connection with rotary conductors having an extended life.

It has been found that by plating the relative rotating elements of the rotary conductor, if the plating metals are properly chosen with respect to the liquid metal, amalgamation can be eliminated and the resistance of the rotary conductor will remain substantially constant throughout the life of the conductor.

When the liquid metal is mercury, it has been found that nickel is an effective plating metal.

Gallium has also been found to be a suitable liquid metal for use in rotary conductors. When the liquid metal is gallium, the plating metal is preferably iridium or tantalum. Of the two metals, iridium is more resistant to filming or oxidization in atmosphere. Tantalum is relatively inert as a result of combination of tantalum oxide ($Ta_2O_5$) in the form of a thin, tenacious, self-healing film. It has been found that the rotary conductor of this invention meets the primary consideration of having a low and constant resistance over prolonged work periods at current flow on the order of 5,000 amperes. The resistance of rotary conductors formed in accordance with this invention is in the range of 5–30 microohms.

It is pointed out here that although in the illustrated form of the invention the shaft is the rotor and the housing is the stator with the shaft carrying the roller electrode 6 in other rotary conductors utilized for welding purposes, the relationship may be reversed with the shaft being fixed and the housing rotating as the rotor and having secured thereto the roller electrode. Such a rotary conductor would be required when the roller electrode is an internal electrode in the seam welding of tubular members, such as can bodies. When can bodies are being welded, it would be apparent that the rotary conductor would have to be relatively small so as to be received within a horn structure of a size limited to the internal size of the can body being welded. The interior diameter of the most popular size of can body is $2^{11}/_{16}$ inches. Thus, it will be apparent that the rotary conductor must not only be of a construction to have a low and constant resistance, but also be small.

Although the rotary conductor has been specifically illustrated and described for use in conjunction with welding apparatus, it is to be understood that it is not so limited as to use. There are many applications where it is necessary to conduct electrical energy involving high levels of current through a rotary connection. The rotary conductor of this disclosure may be utilized in these instances.

I claim:

1. A rotary conductor for transferring electrical energy involving high levels of current, said conductor comprising a housing, a shaft, bearing means rotatably journaling said shaft within said housing for relative rotation, and liquid metal within said housing and between said housing and said shaft, seals between said housing and said shaft on opposite sides of said liquid metal for confining said liquid metal, said housing and said shaft each having means for coupling a conductor thereto, said conductor coupling means being offset relative to each other along the longitudinal axis of said shaft whereby an electromagnetic force on the liquid metal is developed in the use of said rotary conductor urging said liquid metal out of one end of said housing, and baffle means carried by said housing adjacent said housing one end and projecting towards said shaft for limiting the pressure of said liquid metal on an adjacent one of said seals.

2. The rotary conductor of claim 1 wherein said baffle means includes said shaft having an end portion of reduced diameter and said housing having a radially inwardly directed projection aligned with and disposed closely adjacent said shaft end portion to define a baffle-like shoulder, said adjacent seal being disposed axially outwardly of said baffle-like shoulder.

3. The rotary conductor of claim 1 wherein said rotary conductor is part of a welding apparatus and one of said conductor coupling means is in the form of an electrode mount.

4. The rotary conductor of claim 1 wherein said housing and said shaft are formed primarily of a basic highly electrically conductive metal having a coating of a metal resistive to amalgamation with said liquid metal, said metal coating being from the group consisting of iridium and tantalum.

5. A rotary conductor for transferring electrical energy involving high levels of current, said conductor comprising a stator and a rotor spaced from one another, and liquid gallium filling the space between said stator and said rotor and forming an electrically conductive film, said stator and rotor being formed primarily of a basic highly electrically conductive metal having a coating of a metal resistive to amalgamation with said gallium, said metal coating being from the group consisting of iridium and tantalum, and seal means between said stator and said rotor for confining said gallium.

6. The rotary conductor of claim 5 wherein said basic highly conductive metal is basically copper.

7. The rotary conductor of claim 5 wherein the current carrying capacity of said rotary conductor is on the order of 5,000 amperes.

8. The rotary conductor of claim 5 wherein the current carrying capacity of said rotary conductor is on the order of 5,000 amperes and the resistance of the rotary conductor is in the range of 5–30 microohms.

References Cited

UNITED STATES PATENTS

| | | | |
|---|---|---|---|
| 3,133,216 | 5/1964 | Sayers | 339—5 |
| 3,163,792 | 12/1964 | Sayers | 310—219 |
| 3,295,091 | 12/1966 | Von Mossin | 339—5 |

FOREIGN PATENTS

| | | |
|---|---|---|
| 1,133,045 | 11/1956 | France. |
| 1,300,960 | 7/1962 | France. |

MARVIN A. CHAMPION, *Primary Examiner.*

PERRY TEITLEBAUM, *Assistant Examiner.*

U.S. Cl. X.R.

310—178, 232; 339—5, 278